Patented Dec. 13, 1927.

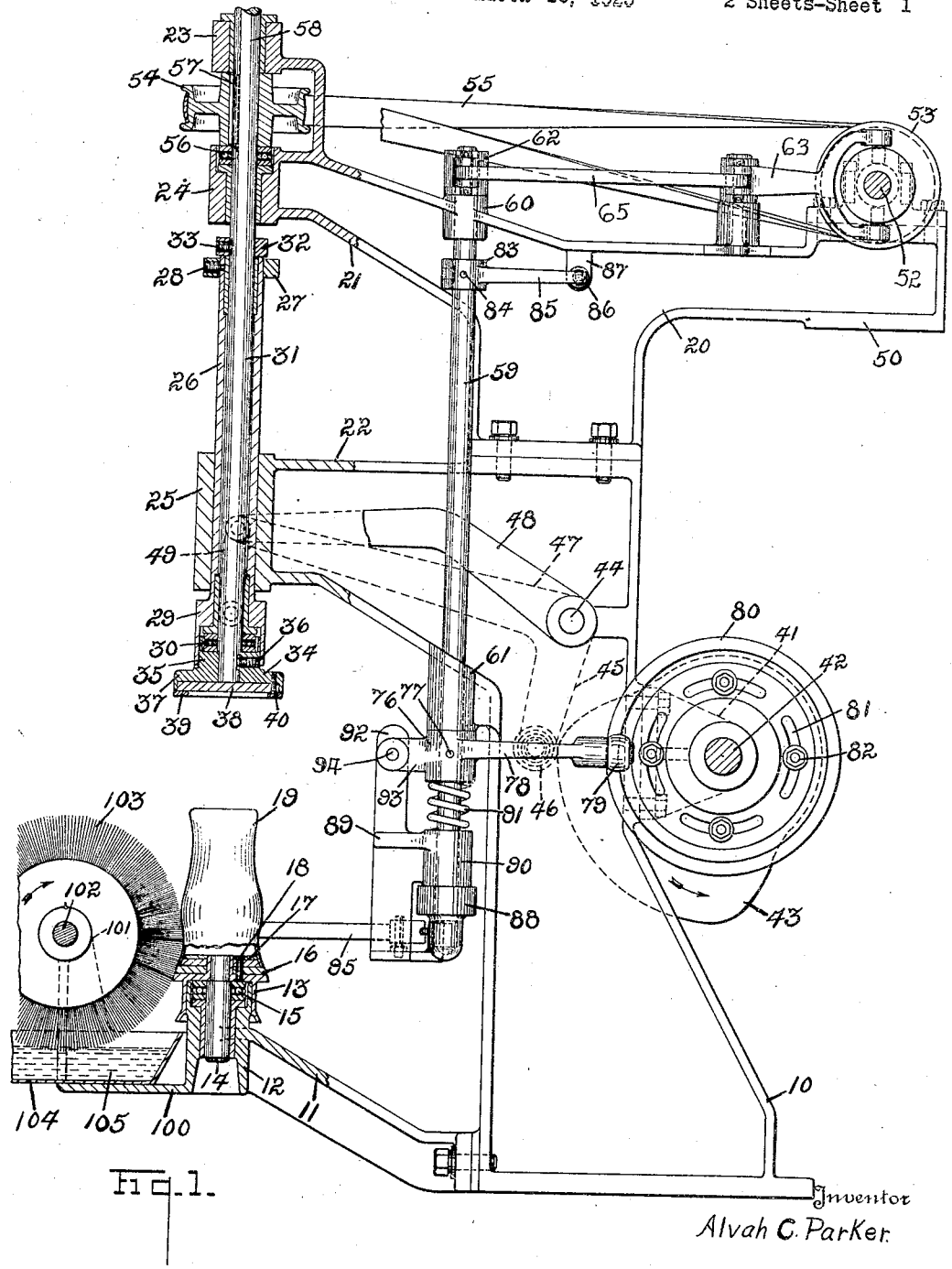

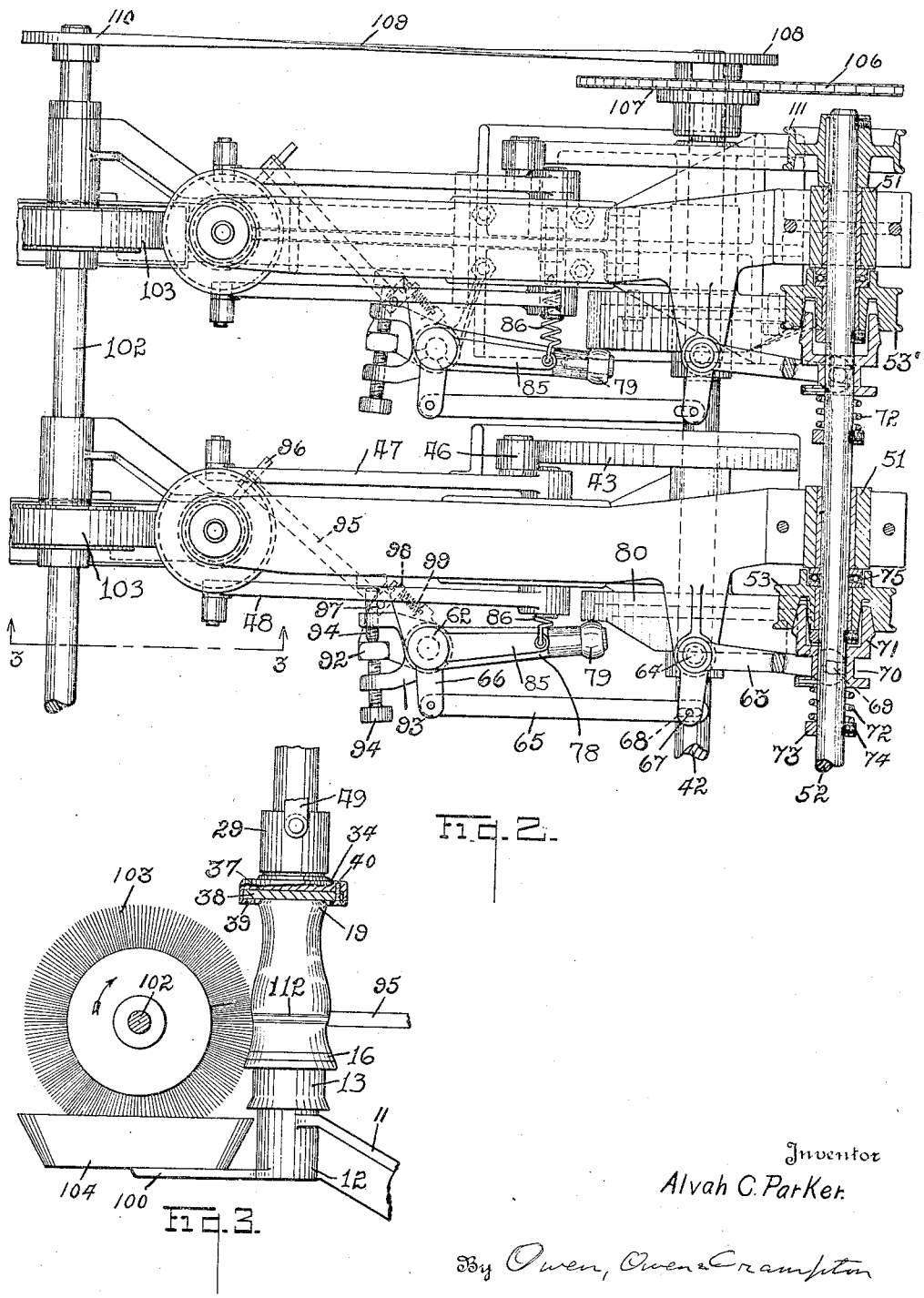

1,652,494

UNITED STATES PATENT OFFICE.

ALVAH C. PARKER, OF TOLEDO, OHIO, ASSIGNOR TO THE LIBBEY GLASS MANUFACTURING COMPANY, OF TOLEDO, OHIO, A CORPORATION OF OHIO.

BANDING MACHINE.

Application filed March 16, 1925. Serial No. 15,749.

My invention relates to a banding machine, such as is used in forming ornamental bands on tumblers and the like.

The purpose of my invention is to provide an apparatus by which such bands may be applied in an expeditious, accurate and uniform manner. Minor objects will appear as the description of the invention proceeds.

In the accompanying drawings, forming a part of this specification, Figure 1 is a side elevation of apparatus embodying my invention, with parts broken away and parts in section; Fig. 2 is a plan view of the apparatus with parts in section; Fig. 3 is a detail view substantially on the line 3—3 of Fig. 2.

My machine is supported by a main frame 10, which in turn is mounted in any suitable manner. To the lower end of frame 10 there is attached a forwardly extending bracket 11 having therein a vertical bearing 12. An article support 13 has a spindle 14 mounted in bearing 12. Ball bearing 15 is positioned beneath the article support and around the spindle in order to furnish an anti-friction support for member 13. A rubber disk 16 is mounted upon member 13 and is held in place by a clamp plate 17 attached to member 13 by screws 18. The rubber disk forms a support for the edge of a tumbler 19 or a similar open-mouthed article, the mouth of the article being positioned on plate 17.

A casting 20 is attached to the upper end of frame member 10 and has a forwardly extending arm 21, while an arm 22 extends from the frame member 10 beneath arm 21. Two vertically aligned bearings 23 and 24 are formed in the front end of arm 21, and an aligned bearing 25 is formed in the front end of arm 22, and bearings 23, 24 and 25 are in alignment with bearing 12.

A sleeve 26 is mounted reciprocably within bearing 25. A collar 27 is attached by means of a set screw 28 to the upper end of sleeve 26. At the lower end of sleeve 26 there is an enlarged head 29 having thereunderneath a ball bearing 30. A spindle 31 is mounted rotatably within the sleeve. A collar 32 is attached to the spindle by means of a set screw 33, the collar 32 being in position to rest upon the upper end of sleeve 26.

An operating head 34 has a hub 35 attached to the lower end of spindle 31 by a set screw 36, and the upper end of this head forms a support for ball bearing 30. The lower end of head 34 is in the form of a plate 37. A rubber disk 38 is attached to the lower side of plate 37 by a clamping ring 39 secured by screws 40 to plate 37.

On the rear side of frame member 10 there is formed a bearing 41 for a cam shaft 42. The cam shaft carries a cam 43. In frame member 10 there is also mounted a rock shaft 44 having a downwardly extending arm 45 carrying a cam roller 46 in position to contact cam 43. Rock shaft 44 has forwardly extending arms 47 and 48 connected by links 49 to the enlarged head at the lower end of sleeve 26.

Casting 20 has a rearwardly extending arm 50 upon which there is mounted a bearing 51 for a drive shaft 52. A pulley 53 is mounted on shaft 52. A pulley 54 is mounted upon spindle 31 between bearings 23 and 24 and is driven by a belt 55 connecting it with pulley 53. Pulley 54 drives spindle 31 by means of a key 57, which fits in a vertically elongated keyway 58 in the spindle.

A vertical rock shaft 59 is mounted in suitable bearings 60, on casting 20, and 61, on frame member 10. A collar 62 is secured to the upper end of rock shaft 59. A bell crank lever 63 is pivoted to arm 50 at 64. A link 65 is pivoted at one end to an arm 66 extending from collar 62. The two ends of bell crank lever 63 are forked and a pin 67 in one of these ends passes through a slot 68 in the end of link 65, while pins 69 in the other end of bell crank lever 63 enter groove 70 in a clutch member 71, which is slidably keyed to shaft 52 and is adapted to be thrust into clutching engagement with pulley 53. A spring 72 surrounds shaft 52 and is normally compressed between clutch member 71 and a collar 73 adjustably secured to shaft 52 by a set screw 74. Ball bearing 75 is interposed between bearing 51 and pulley 53 in order to take the end thrust of the spring when the clutch member is in operative position.

A collar 76 is pinned to rock shaft 59 immediately below bearing 61. A rearwardly extending arm 78 on collar 76 carries a cam roller 79 in position to be engaged by a cam 80. The cam 80 is constructed with slots 81 through which extend bolts 82 connecting the cam adjustably to a suitable disk carried on shaft 42. A collar 83 is attached to rock shaft 59 by a pin 84, and has a rearwardly extending arm 85. A spring 86 normally draws the end of arm 85 towards a lug 87 formed on hub casting 20, and thereby roller 79 is held against cam 80.

A cup nut 88 is screwed on to the lower end of rock shaft 59. A tool carrier 89 has a collar 90 loosely mounted on rock shaft 59 and resting upon cup nut 88. A spring 91 between collar 76 and collar 90 insures that collar 90 will always remain in position against cup nut 88.

A vertical lug 92 rises from tool carrier 89 between the arms of fork 93 on collar 76. Adjusting nuts 94 pass through the arms of fork 93 to adjust lug 92 with relation to the rock shaft. An arm 95, carrying at its outer end suitable tools 96, is pivoted at 97 to member 89. Lug 98, extending from arm 95, is pressed by spring 99 so as to swing arm 95 a limited distance towards a tumbler resting upon the work support.

Bracket 11 has a forwardly extending arm 100 having a bearing 101 for a shaft 102, which carries a circular brush member 103. A pan 104 containing an abrasive mixture 105 is positioned upon extension 100 in such position that brush member 103 will enter the abrasive material. Cam shaft 42 is driven from any suitable source, as by a sprocket chain 106 driving sprocket wheel 107 attached to the cam shaft. A belt pulley 108 on the end of cam shaft 42 drives a belt 109, which passes over a pulley 110 on the end of shaft 102 and thereby drives the brush. Spindle operating shaft 52 may be driven from any suitable source, as by a belt driving pulley 111 on the end of the shaft.

In Fig. 2 there are shown in plan view two similar banding machines mounted side by side and having certain elements in common. As these two machines are identical in all respects, the corresponding parts are identified by the same reference characters, but it will be seen that the parts are in different positions of their cycle in the two machines, the parts of the upper machine being in the positions indicated in Fig. 1, while the position of the spindle, etc., of the machine in the lower position is indicated in Fig. 3.

The operation of the apparatus is substantially as follows:

With the sleeve, and consequently the spindle, raised as shown in Fig. 1, a tumbler is placed by the operative on the stationary article support 13. The tumbler is readily centered by plate 17 and the lower edge is frictionally engaged by rubber disk 16. The article retains its position on the support, so that the operative may release it at once after it has been placed in position. In this position of the apparatus, the tool carrier is held by cam 80 in the position indicated in the upper part of Fig. 2, so that the tool is out of contact with the tumbler.

As shaft 42 revolves, cam 43 allows sleeve 26 to lower until plate 38 rests upon the upper end of the tumbler. Cam 80 is so adjusted that it allows rock shaft 59 to be rocked by spring 86 and at substantially the same time that the spindle is lowered, but the rocking of the shaft is not completed until after plate 38 rests on the tumbler. Looking at the apparatus in the upper part of Fig. 2, it will be readily seen that, as link 65 moves to the right, spring 72 will force clutch member 71 towards pulley 53 and maintain pins 67 at the outer end of slot 68 until the clutch member contacts the pulley. The parts are so timed that this will occur immediately after the engagement of the tumbler by plate 38.

After clutch member 71 contacts pulley 53 and rotation of the spindle and work is thereby begun, rock shaft 59 continues to rock. During this continued movement of rock shaft 59, link 65 moves to the right without affecting bell crank lever 63 because of the lost motion allowed by slot 68. This rocking movement of shaft 59 continues until tool 96 is carried into contact with the tumbler, and the pressure of the tool against the tumbler is regulated by spring 99, which may be made adjustable, if desired, by means not shown. Brush 103 lightly contacts the front side of the tumbler and smears it with an abrasive mixture and, as the tumbler smeared with this abrasive mixture is rotated in contact with the tool, suitable bands 112 are formed thereon. The tools are constructed and arranged in accordance with the design desired.

After a suitable interval, cam 80 again rocks shaft 59, first carrying the tool out of contact with the tumbler and then, when the lost motion provided by slot 68 is taken up, withdrawing clutch member 71 so that the spindle is stopped. About the same time cam 43 raises the spindle so that the tumbler may be removed and another article put in its place. The time during which the tool should contact the article is dependent upon several variable factors, amongst which is the pressure of the tool. This pressure may be regulated by adjusting spring 99, and to some extent by adjustment of nuts 94. Nuts 94 may be used to vary the duration of the contact of the tool, as well as the degree of pressure, and to adjust the position of the holder as the tool wears away. Cam 80 may be adjusted to properly time the relative movements, preferably so that rotation starts after the article is contacted by the spindle and ceases before the spindle is raised; and so that the tool engages the article after it begins to rotate and leaves the article while it is still rotating.

As will be readily seen, I have devised apparatus which allows of a number of banding devices being placed closely adjacent to each other where they may be readily attended by one operator. As the tumbler may be removed at any time after the spindle is raised and as the tumbler will maintain its position when dropped into place upon the article carrier, the operative is not compelled to remove the article at the instant when the spindle is raised and does not have to hold the article in position until the spindle is lowered. All that is required is that the removal and replacement shall take place some time while the spindle is raised. This allows an appreciable latitude in the movements of the operative and makes feasible the operation of a plurality of devices by one person, thereby saving considerable hand labor.

As will be seen by the arrows on Figs. 1 and 3, I prefer to drive the abrasive-applying brush so that its side in contact with the article moves downward. The contact of the brush against the article is light, so that it is not likely to disturb the article, whatever its direction of rotation, but the arrangement shown prevents any possibility of such result.

I have mentioned rubber as an especially suitable material for the parts engaging the article, but other materials might be used. The particular suitability of rubber lies in its yielding nature and its frictional surface.

The work support is so constructed that it automatically centers by gravity an article placed thereon, and holds the article in substantially centered position when merely dropped thereon. This enables the operative to position the article with the minimum of time and care. At the same time, both spindle and tool are so constructed that slight irregularity in the structure of the article or slight inaccuracy in its centering is not fatal to the success of the banding operation.

While I have disclosed in considerable detail one embodiment of my invention, it will be readily apparent that various modifications can be made therein within the scope of the appended claims which define my invention.

What I claim is:

1. A work support rotatable on a substantially vertical axis and constructed to center by gravity an article resting thereon, and automatic means for engaging and rotating an article thus centered.

2. In apparatus for banding glass articles, a rotatable work support adapted to receive a glass article and to center it by gravity, automatic means for engaging and rotating an article thus centered, a banding tool, and automatic means for moving the tool to and from the article in timed relation to the movement of the rotating means.

3. In apparatus for banding glass articles, a rotatable work support adapted to receive a glass article and to center it by gravity, automatic means for engaging and rotating an article thus centered, a banding tool, and automatic means for moving the tool into engagement with an article after the article is engaged by the rotating means and for moving the tool away from the article before the rotating means is disengaged therefrom.

4. In combination, a work support mounted rotatably upon a vertical axis, a spindle above and in axial alignment with the support, means on the lower end of the spindle adapted to frictionally engage an article on the support, means to reciprocate the spindle to and from an article on the support, a constantly rotating shaft, means connecting the spindle and shaft and including a clutch, and automatic means to close the clutch after the spindle engages an article and to open the clutch before the spindle disengages the article.

5. In combination, a work support rotatable on a vertical axis and adapted to support an article in axial alignment therewith, means adapted to engage the upper end of an article on the support and rotate it, a banding tool adapted to engage the side of the article, and means to apply abrasive material to the side of the article.

6. In combination, a work support rotatable upon a vertical axis and adapted to center an article thereon by gravity, an abrasive applying rotary brush in position to contact an article centered on the support, a tool adapted to engage the side of said article, and means adapted to rest upon the article and cause it to rotate.

7. In combination, a work support rotatable about a vertical axis and adapted to center an article thereon by gravity, a pan adjacent the support and adapted to contain abrasive material, a brush mounted on a horizontal axis in position to dip into the pan and contact an article centered on the support, and means to rotate the brush in such a direction as that its side in contact with the article moves downward.

8. In combination, a work support rotatable about a vertical axis and adapted to center an article thereon by gravity, means reciprocable to and from the article and adapted to rest thereon and rotate it, a pan adjacent the support and adapted to contain abrasive material, a brush mounted on a horizontal axis in position to dip into the pan and contact an article centered on the support, and means to rotate the brush in such a direction as that its side in contact with the article moves downward.

9. In tumbler banding apparatus, a plurality of banding devices arranged side by side in close proximity and each comprising a work support rotatable about a vertical axis and adapted to support a tumbler in centered position thereon, and automatic means for engaging and rotating for a predetermined limited time an article so centered, and automatic means for banding a tumbler while it is so rotated.

In testimony whereof, I have hereunto signed my name to this specification.

ALVAH C. PARKER.